(12) United States Patent
Richardson, Sr. et al.

(10) Patent No.: US 9,249,311 B2
(45) Date of Patent: Feb. 2, 2016

(54) EASILY REMOVABLE INDOOR/OUTDOOR CONCRETE CURING COMPOUND

(71) Applicant: The Euclid Chemical Company, Cleveland, OH (US)

(72) Inventors: Thomas Wayne Richardson, Sr., Aurora, OH (US); Tatiana Anatolievna Golovkova, Lakewood, OH (US); Thomas Wayne Richardson, Jr., Aurora, OH (US)

(73) Assignee: The Euclid Chemical Company, Cleveland, OH (US)

( * ) Notice: Subject to any disclaimer, the term of this patent is extended or adjusted under 35 U.S.C. 154(b) by 453 days.

(21) Appl. No.: 13/690,567

(22) Filed: Nov. 30, 2012

(65) Prior Publication Data

US 2013/0165569 A1   Jun. 27, 2013

Related U.S. Application Data

(60) Provisional application No. 61/565,675, filed on Dec. 1, 2011.

(51) Int. Cl.
| | |
|---|---|
| C09D 5/00 | (2006.01) |
| B65B 33/00 | (2006.01) |
| C08L 25/00 | (2006.01) |
| C04B 41/00 | (2006.01) |
| C04B 40/04 | (2006.01) |
| C04B 41/45 | (2006.01) |
| C04B 41/61 | (2006.01) |
| C04B 111/27 | (2006.01) |

(52) U.S. Cl.
CPC ............... *C09D 5/008* (2013.01); *C04B 40/04* (2013.01); *C04B 41/009* (2013.01); *C04B 41/459* (2013.01); *C04B 41/61* (2013.01); *C04B 2111/27* (2013.01)

(58) Field of Classification Search
CPC ............ C08L 25/00; B65B 33/00; C09D 5/00
USPC ..................... 524/2, 274; 427/154
See application file for complete search history.

(56) References Cited

U.S. PATENT DOCUMENTS

| | | | |
|---|---|---|---|
| 3,832,223 A * | 8/1974 | Wohl | 427/401 |
| 5,360,847 A | 11/1994 | Dewacker et al. | |
| 2009/0162540 A1 * | 6/2009 | Golovkova et al. | 427/154 |

OTHER PUBLICATIONS

Lawter—Burez Rosin Soaps—(www.lawter.com/index.php?page=offset-varnishes-2) Online—Apr. 28, 2011 Downloaded—Mar. 18, 2015.*

* cited by examiner

*Primary Examiner* — Ling Choi
*Assistant Examiner* — Ronald Grinsted
(74) *Attorney, Agent, or Firm* — Calfee, Halter & Griswold LLP

(57) ABSTRACT

A water-resistant, easily removable indoor/outdoor concrete curing coating compound including water, a hydrophobic membrane-forming polymer resin, and a rosin soap or rosin soap derivative that is readily self-degrading and film-forming.

23 Claims, No Drawings

EASILY REMOVABLE INDOOR/OUTDOOR CONCRETE CURING COMPOUND

BACKGROUND

"Concrete curing compounds" are commonly applied to freshly poured concrete to retard evaporation of water, thereby enhancing the concrete's compressive strength and other key physical characteristics once cured. U.S. Pat. No. 5,360,847 describes a concrete curing compound comprising an aqueous emulsion of a styrene and/or acrylic polymer to which a polysaccharide has been added to make the barrier film produced by the emulsion removable. Although this patent indicates these barrier films can be removed by abrasion in the presence of water only, the detailed description shows that, as a practical matter, an enzyme for the polysaccharide must be included not only in the coating compound itself but also in the wash water used for the removal process.

Additionally, U.S. Patent Publication No. 2009/0162540 describes an aqueous based concrete curing compound that is made easily removable by including a water-soluble polymer resin, such as polyvinylpyrrolidone. The barrier films faulted from the curing compound may be removed by the application of an aqueous cleaning solution and moderate abrasion. Although this curing compound is highly effective, its ingredients are activated by water. Therefore, it is not especially water-resistant and hence is preferably used indoors.

Accordingly there remains a need for a weather resistant, indoor/outdoor concrete curing compound that is not only water-resistant but also easily removable on demand.

SUMMARY

In accordance with this invention, an aqueous based concrete curing compound is provided that is both water-resistant and easily removable due to the inclusion of a film-forming rosin soap or the like in the compound.

Thus, this inventive concepts provides a water-resistant, easily removable indoor/outdoor concrete curing coating compound comprising water, an emulsifiable hydrophobic membrane-forming polymer resin and a rosin soap or rosin soap derivative that is self-degrading and film-forming.

In addition, the inventive concepts further provide a process for forming a water-resistant, easily removable concrete curing compound comprising combining a self-degrading, film-forming rosin soap or rosin soap derivative and a hydrophobic membrane-forming polymer.

In addition, this inventive concepts further provide a process for retarding premature evaporation of water from freshly poured concrete comprising applying the above concrete curing compound to the freshly poured concrete and thereafter allowing the curing compound to dry, thereby forming a water-resistant easily removable barrier film, having moisture retention properties complying with ASTM C 309.

DETAILED DESCRIPTION

The general inventive concepts are directed to an aqueous based concrete curing compound that is made both easily removable and water resistant by including a water-soluble, tree sap derivative, such as rosin soap, or a rosin soap alternative in the compound. In this context, "easily removable" means that the barrier film made by such compound can be readily removed by moderate abrasion as determined by the following test, which can also be used as initial screening tool to select the most suitable compound. A 6-mil-thick drawdown is applied onto an impervious substrate, such as an aluminum or other metal panel; the formed film is allowed to dry for 7-10 days to ensure complete evaporation of the volatile matter in the compound. While drying, the samples are kept in the dark in order to avoid potential degradation of the film due to UV light. After that, a few drops of water (or the aqueous wash solution intended for use in removing the barrier film, as further discussed below) are placed onto the dried film. At the end of 10 minutes, and at 10-minute intervals until failure, the film is tested with a cotton swab. The film is considered to fail (i.e., to be removable) when it can be easily disintegrated with a cotton swab to which a light manual pressure is applied. Barrier films that are removable within 30 minutes are considered to be "easily removable."

In this context, "water-resistant" means that the barrier film passes the water resistance test discussed below in Example 2. The water resistance test in Example 2 is an analytical test in which the inventive curing compound is applied to freshly poured concrete and allowed to dry The water resistance and removability of each barrier film is determined by dripping both water and detergent independently on the panels. A barrier film that is removed only with the detergent, as determined by visual inspection, is regarded as a pass. That is, a barrier film that shows erosion and degradation in the presence of water is regarded as a fail.

Compositions which are applied to freshly poured concrete for preventing premature evaporation of water are referred to in industry as "concrete curing compounds," even though they are clearly not true "compounds," by definition, since they contain multiple ingredients. Accordingly, in this disclosure, the conventional terminology of "concrete curing compounds" is used for consistency.

In order to qualify as a "concrete curing compound" in the United States coating must meet the requirements of ASTM C 309, "Standard Specification for Liquid Membrane-Forming Compounds for Curing Concrete," which is a measure of the ability of the barrier film formed by the compound when dried to retain moisture in the concrete substrate to which it is applied. Currently available ("conventional") concrete curing compounds are very difficult to remove when cure of the concrete is essentially complete, which typically occurs within 7-10 days of pouring. Abrasive grit, shot, sand blasting and/or aggressive abrasion with multiple passes of a professional floor cleaning machine equipped with a highly aggressive abrasive pad is normally required, usually in combination with aggressive chemical cleaners and/or acidic stripping solutions.

Aqueous based concrete curing compounds may comprise an aqueous emulsion of a hydrophobic polymer which is capable of forming a coherent, water-impermeable membrane when the emulsion is applied to a concrete substrate and dried, hereinafter a "hydrophobic membrane-forming polymer." Alternatively, such concrete curing compounds may also comprise an emulsion or latex in which the hydrophobic membrane-forming polymer is dissolved and/or dispersed in an organic solvent, with the solution/dispersion so obtained being emulsified or dispersed in water.

Many different organic polymers may be used as the hydrophobic membrane-forming polymer in concrete curing compounds. Examples include chlorinated rubbers, styrene copolymers, acrylic copolymers, hydrocarbon resins, paraffin waxes, and the like. All such hydrophobic membrane-forming polymers which have previously been used to formulate concrete curing compounds, as well as all hydrophobic membrane-forming polymer which may be used in the future to formulate concrete curing compounds, can be used to make the water-resistant, easily removable concrete curing coating compounds of this invention.

In addition to the hydrophobic membrane-forming polymer, aqueous based concrete curing compounds may also contain various other ingredients such as organic solvents for suspending and/or dissolving the polymer resin, coalescing agents, plasticizers, defoaming agents, biocides, antimicrobial agents, emulsifying agents, pigments such as titanium dioxide, zinc oxide pigments, and the like. See, for example, the above-noted U.S. Pat. No. 5,360,847. All such additional ingredients which have previously been used to formulate concrete curing compounds, or which may be used in the future to formulate concrete curing compounds, in the concentrations in which they have or will be used, can be used to make the water-resistant, easily removable concrete curing coating compounds of this invention.

In accordance with some exemplary embodiments of the present invention, an aqueous-based concrete curing compound is made water-resistant as well as easily removable by including in the compound an additive, such as a tree-sap derivative, including rosin soap, a rosin soap alternative, or similar hydrocarbon resin.

Rosin refers to a series of chemicals isolated from the "tall oil" that is produced during kraft pulping of pine wood. One of the main components is abietic acid, a partially unsaturated compound with three fused six-membered rings and one carboxyl group.

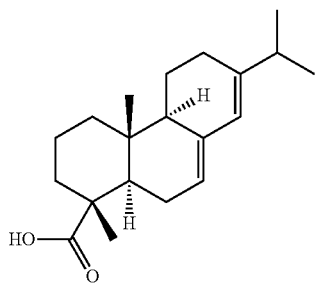

The rosin combines with caustic alkalis to form salts that are known as rosin soaps. By saponifying the rosin with the addition of caustic soda, sodium carbonate, or other alkali metal alkalis, the rosin soap becomes soluble in water. The water-soluble rosin soap then becomes water-resistant once it is combined with the other ingredients of the concrete curing compound and dries, although it will dissolve in detergent. Therefore, in some exemplary embodiments, the coating compound can withstand weather elements and will not break down in the presence of water.

In accordance with various exemplary embodiments, the rosin soaps are "film-forming" and "self-degrading." By "film-forming," it is meant that an aqueous solution of the polymer, when deposited on an impervious substrate and dried, will produce a coherent film of the polymer. By "self-degrading," it is meant that once the curing compound, containing the rosin soap, is applied, the resin in the rosin soap begins to dissipate as it is exposed to ultraviolet radiation or natural radiation from the sun. The compound degrades as it protects. Thus, these polymers differ from the water-soluble, enzyme susceptible polysaccharides of U.S. Pat. No. 5,360,847 which, after being formed into a film or a component of a film, must be chemically degraded such as by enzymes or the like before they can redissolve.

Essentially any rosin soap, rosin soap alternative, and rosin soap derivative that is water-soluble and film-forming at application temperatures can be used for the purposes of this invention. As well understood in the art, concrete curing compounds are commonly applied at temperatures as low as −4° C., although in most cases, the hydration of concrete slows or stops at 40° F. (about 4.44° C.) Therefore, the water-soluble rosin soaps used in this invention desirably are film-forming at temperatures as low as −4° C., at least in some embodiments.

The pH of the rosin soap that can be used in this invention can vary, and essentially any pH may be used so long as the desired performance requirements of the compounds obtained therefrom are retained. In some exemplary embodiments, the pH of the water-soluble polymer will be between about 8-12, and even between about 9-11. In other exemplary embodiments, the pH of the water-soluble polymer will be on the order of about 9.5-10.3.

The amount of rosin soap that can be included in particular embodiments of the inventive compound may be selected to achieve the desired performance requirements of compound obtained. In some exemplary embodiments, the concentration of the rosin soap may be selected to achieve a desired balance between different properties. In some exemplary embodiments, the concentration of rosin soap in the inventive concrete curing compounds will be between about 5-30 wt. %, based on the total weight of solids (i.e., the total amount of rosin soap plus hydrophobic membrane-forming polymer) in the compound. In other exemplary embodiments, the concentration of rosin soap in the inventive curing compounds will be between about 8-25 wt. %. In yet other exemplary embodiments, the concentration of rosin soap in the curing compound will be between about 10-20 wt. %.

In some exemplary embodiments, when the rosin soap is used in the correct amount, it produces a barrier membrane, which exhibits the necessary moisture retention properties as well as the necessary easy removability properties, while also providing water resistance.

In accordance with some exemplary embodiments, the inventive concrete curing compounds meet the industry recognized standard for moisture retention properties, as set forth in ASTM C 309, "Standard Specification for Liquid Membrane-Forming Compounds for Curing Concrete." In other exemplary embodiments, the concrete curing compounds are also easily removable, meaning that the rosin soaps are self-degrading and a barrier film made by such a compound can be readily removed by a detergent cleaning solution, either alone or after the film begins to self-erode.

Application and Removal

The inventive concrete curing compound may be applied to a concrete substrate in the same way as conventional concrete curing compounds, e.g., by depositing a quantity of the curing compound on the substrate, spreading the compound at the appropriate wet film thickness and allowing the liquid film to dry into a coherent barrier film. In some exemplary embodiments, this is achieved by paint roller or squeegee but is more commonly spray applied with manually or mechanically pressurized equipment dependant on the area size.

According to some exemplary embodiments, the barrier film formed from the inventive concrete curing compound may be removed following the general procedure described above, such as, for example, by (1) subjecting the barrier film to moderate abrasion when in contact with an emulsifier such as a detergent or soap, or (2) first allowing the film to self-degrade with exposure to pure ultraviolet radiation or sunlight, and then moderately abrading the degraded film with an emulsifier such as a detergent or soap. Moreover, additional washing and/or rinsing steps may also be performed, if desired.

The initial self-degrading step may be done by the compound itself, as the carbon bonds in the hydrocarbon begin to break after exposure of UV radiation through sunlight or other sources. Once the initial degradation has begun, a soap, detergent, or other emulsifier may be used to remove the remainder of the compound. It is believed that the use of detergent makes removal of the compound easier and can even remove the compound before any degradation has occurred. Any soap, detergent or other emulsifier/surface active agent can be used for this purpose, such as, for example, Smok-Solv Liquid Wall Wash available from Chemical Specialties Manufacturing Corporation, 901 North Newkirk Street, Baltimore, Md. 21205, which is believed to be an aqueous blend of sodium orthosilicate, 2-butoxyethanol, and alcohol ethoxylates, or Ecolution Pro Cleaner Degreaser, which is believed to be an aqueous mixture of ethoxylated alcohols, sodium gluconate and alkyl polyglycoside, supplied by State Chemical Solutions located at 3100 Hamilton Avenue, Cleveland, Ohio 44114.

Theoretically, there is no maximum amount of time in which the self-degradation step is to be completed, since the film continues to protect the concrete slab even after degradation of the film has begun. In some exemplary embodiments, the film becomes weaker as a result of the self-degradation, which in turn allows the detergent to remove the compound quicker. Complete erosion of the film may take months; therefore, the film can be left on the concrete slab for an undefined amount of time. The eroding time depends on, among other things, the strength and exposure time to the UV radiation.

In some exemplary embodiments, the barrier film may be moderately abraded with a detergent once the film has already began to self-erode. As a result, the physical integrity of the degrading barrier film is weakened and the bond between the barrier film and the surfaces of the concrete substrate is broken. Any film not taken up by the abrasive pad of the floor cleaning machine can be easily removed by additional passes with successive abrasive grit pads mounted on the appropriate commercial floor cleaning machine, pressure washing with clean water, simply spraying with water from a garden hose, or the like.

In some exemplary embodiments, the barrier film formed by the inventive concrete curing agent may be used in either indoor or outdoor applications, while still providing on-demand removal not possible with conventional concrete curing compounds, at least in the time frame in issue here, about 7-10 days after application. In practice, abrasion of barrier films made from concrete curing compounds often requires the use of commercial floor cleaning machines which rotate and slide a suitable abrasion pad mounted on a rotating platen of the machine across the section of the concrete floor being treated. The severity of abrasion depends on the structure of the abrasion pad, the pressure exerted on abrasion pad from the weight of the cleaning machine on the platen, the speed of rotation, and the contact time for the abrasion step. In some instances, this abrasion may then be augmented with harsh corrosive and or toxic chemical strippers and cleaners that degrade, etch, digest, and or attack the barrier film along with the surface of the concrete slab.

Additionally, some conventional barrier films may only be removed with extremely severe abrasion such as by sand blasting. Severe abrasion can also be provided by commercial floor cleaning machines using extremely abrasive pads, very high abrasion pressures, long abrasion times, harsh corrosive chemical strippers and cleaners or combinations thereof. In this invention, however, such severe abrasion is unnecessary, since the barrier films provided by the inventive concrete curing compounds are easily removable with light to moderate abrasion normally with mild eco-friendly soaps or detergents.

Thus, in some exemplary embodiments, the barrier films produced from the inventive concrete curing compounds are removable by the one or two step removal process discussed above when exposed to UV radiation and using light to moderate abrasion, such as that provided by conventional commercial floor cleaning machines using abrasion pads having moderate abrasion characteristics and operated for relatively short periods of time. In one exemplary embodiment, the abrasion is provided by a Model RGS-50 or GPS33 industrial floor cleaning machine available from Draygon Enterprises, Inc. of 46 Commercial Street, Webster, N.Y., 14580, or Model 7760 industrial floor cleaning machine available from American Lincoln of 1100 Haskins Road, Bowling Green, Ohio 43402, when equipped with a blue or green medium duty high porosity wet scrubbing pad for a total abrasion time per unit area of concrete floor of no more than 10 seconds. On smaller concrete areas, a scrub brush may also work in the place of a cleaning machine.

EXAMPLES

In order to more thoroughly describe this invention, the following working examples are provided.

Example 1

Forming Process

Each concrete curing compound was formed by adding a water-soluble, easily removable, film-forming rosin soap to a conventional aqueous based concrete curing compound, namely, Kurez DR VOX available from The Euclid Chemical Company of Cleveland, Ohio, which is composed of a solution of hydrocarbon resin (LX-1200 resin, NJ TSRN#51721300-5490P) dissolved in Stoddard Solvent (mineral spirits) dispersed in >60 wt. % water. The amount of rosin soap added to each compound was 10-20% by weight, based on the total weight of solids in the compound. In some instances, the rosin soap was pre-dissolved in deionized water before the addition to ensure it is thoroughly blended with the hydrocarbon emulsion. In other instances, the rosin soap was added as a powder. Table 1 provides one exemplary embodiment of the components and process of manufacturing the inventive water-resistant, easily removable curing compound.

TABLE 1

Removable Curing Compound - Process of Manufacturing

| Components | Operations |
|---|---|
| LX-1200 in mineral spirits | 70% resin solution |
| Igepal CO-660 | Then add emulsifying agent |
| Water | And make emulsion in water |
| Solthix A100 | Add thickening agent |
| Aqua Ammonia | Add ammonia |
| water | Add the rest of water |
| Rosin Soap | Add rosin soap for removability on demand |

Example 2

Water Resistance

The water-resistance of the barrier membranes produced by each new concrete curing compound was then determined by exposing the inventive concrete curing compound samples to various elements. The inventive concrete curing compound samples consisted of three different rosin soap samples mixed with Kurez Dr. Vox at concentrations levels of 20/80 (20 wt. % rosin soap/80 wt. % Kurez Dr. Vox), 15/85 (15 wt. % rosin soap/85 wt. % Kurez Dr. Vox), and 10/90 (10 wt. % rosin soap/80 wt. % Kurez Dr. Vox). Each concrete curing compound sample was applied to a separate 12"×12" aluminum slab that had been prepared using generally accepted practices, finished and possibly burnished with a steel trowel, and the barrier film formed thereby then allowed to sit for at least 7 days.

The water resistance and removability of each barrier film was then determined by dripping both water and detergent independently on the panels. For purposes of this disclosure, the film is considered "water-resistant" if it results in a "pass." A barrier film that is removed only with the detergent, as determined by visual inspection, is regarded as a pass. That is, a barrier film that shows erosion and degradation in the presence of water is regarded as a fail. Also, a barrier film that is not removed essentially completely is regarded as a fail.

Of the three samples, only the 20/80 sample accomplished a "pass" by being removable with detergent only. Both the 15/85 and 10/90 samples were removable with water and therefore not water-resistant.

Example 3

Moisture Retention

Table 2 displays the results of an ASTM C-156 test of the moisture retaining ability of concrete mortar with the inventive concrete curing coating. ASTM C-156 sets forth the standard test method for water loss (from a mortar specimen) through liquid membrane-forming curing compounds for concrete. This test method gives the user a measure of the ability of tested curing materials to impede the escape of moisture from a hydraulic cement mortar. Since it is desirable to retain moisture in fresh concrete to promote the hydration process, failure of the product to minimize the escape of moisture may lead to loss of strength, cracking, shrinkage, or low abrasion resistance of the hardened concrete, or a combination thereof.

In Table 2, the test specimens (N, D, and J) are provided, along with the control (C) in the bottom row of the table. Each specimen is essentially similar in composition, with the coating compound having a non-volatile percentage of 0.1888%. Specimen N comprised about 3680.0 g of mortar coated with 6.03 g (wet) or about 1.14 g (dry) of the inventive coating compound. Specimen D comprised about 3675.3 g of mortar coated with about 6.05 g (wet) and about 1.14 g (dry) of the inventive coating compound. Specimen J included about 3697.6 g mortar coated with a about 6.12 g (wet) and about 1.16 g (dry) of the inventive coating compound. Table 2 shows the weight of the specimen at 0 hours, before they are put in the environmental chamber, and after 72 hours in the environmental chamber. The weight at 0 hours is equal to the weight of the mortar and the dry coating combined. The loss of mass between 0 and 72 hours was then recorded (ML) and the mass loss per unit area (L) in $kg/m^2$ was determined by dividing ML by the area and multiplying this number by 1000. In order to "pass" the test, L must be less than or equal to 0.55 $kg/m^2$ after 72 hours in the environmental chamber. As shown in Table 2, each of the samples including the removable coating passed the moisture retaining test, with L values less than 0.55 $kg/m^2$.

TABLE 2

| Sample | Concrete Curing Compound | Mass of Cement Mortar | Mass of Coating Composition | | Results | | | |
|---|---|---|---|---|---|---|---|---|
| | | | Wet | Dry | 0 Hr. | 72 Hr. | ML | L ($kg/m^2$) |
| N | Removable Dr. Vox | 3680.0 g | 6.03 g | 1.14 g | 3681.14 g | 3668.3 g | 12.84 g | 0.36 |
| D | Tamms Production | 3675.3 g | 6.06 g | 1.14 g | 3676.44 g | 3656.8 g | 19.64 g | 0.54 |
| J | Tamms Production 2 | 3697.6 g | 6.12 g | 1.16 g | 3698.75 g | 3682.5 g | 16.26 g | 0.45 |
| | | | | | | | Average | 0.45 |
| C | Control Dr. Vox | 3669.8 | 7.55 g | 1.42 g | 3671.22 g | 3664.7 g | 6.52 g | 0.18 |

As illustrated in Table 2 above, each of the inventive concrete curing coating samples passed the ASTM C-156 test of the moisture retaining ability of concrete mortar. Therefore, although the control exhibited the least mass loss per unit area, each of the inventive concrete curing coating samples provide sufficient moisture retaining capability, while additionally to being water-resistant and easily removable.

Although only a few embodiments of the present invention have been described above, it should be appreciated that many modifications can be made without departing from the spirit and scope of the invention. All such modifications are intended to be included within the scope of the present invention, which is to be limited only by the following claims:

The invention claimed is:

1. A water-resistant, easily removable indoor/outdoor concrete curing coating compound comprising:
    water;
    a hydrophobic membrane-forming polymer resin;
    an emulsifying agent; and
    5.0-30.0 weight percent of a rosin soap or rosin soap derivative, based on the total weight of solids in the compound, which is self-degrading and film-forming;
    wherein the hydrophobic membrane-forming polymer is a chlorinated rubber, a styrene copolymer, an acrylic copolymer, a hydrocarbon resin, paraffinic wax, or mixtures thereof;
    and wherein the concrete curing coating compound forms a removable barrier film complying with ASTM C309 and is non-dissolvable in water.

2. The compound of claim 1, wherein the hydrophobic membrane-forming polymer is a hydrocarbon resin.

3. The compound of claim 2, wherein the rosin soap or rosin soap derivative has a pH of between 8 and 12.

4. The compound of claim 3, wherein the rosin soap or rosin soap derivative has a pH of between about 9 and 11.

5. An easily removable concrete curing coating compound capable of forming a barrier film complying with ASTM C 309, the compound comprising water, a hydrophobic membrane-forming polymer and a film-forming rosin soap or rosin soap derivative.

6. The compound of claim 5, wherein the hydrophobic membrane-forming polymer is a chlorinated rubber, a styrene copolymer, an acrylic copolymer, a hydrocarbon resin, paraffinic wax, or mixtures thereof.

7. The compound of claim 6, wherein the hydrophobic membrane-forming polymer is a hydrocarbon resin.

8. The compound of claim 5, wherein the rosin soap or rosin soap derivative has a pH of between about 8 and about 12.

9. The compound of claim 8, wherein the rosin soap or rosin soap derivative has a pH of between about 9 and about 11.

10. The compound of claim 5, wherein said coating compound is self-degrading when exposed to UV radiation.

11. A process for forming an easily removable concrete curing coating compound of claim 1 forming a removable barrier film complying with ASTM C 309, the process comprising combining 5.0-30.0 weight percent, based on the total weight of solids in the compound, of a film-forming rosin soap or rosin soap derivative, an emulsifying agent and a hydrophobic membrane-forming polymer, wherein said concrete curing coating compound is water-resistant.

12. The process of claim 11, wherein the hydrophobic membrane-forming polymer is a chlorinated rubber, a styrene copolymer, an acrylic copolymer, a hydrocarbon resin, or mixtures thereof.

13. The process of claim 11, wherein the rosin soap or rosin soap derivative is non-dissolvable in water.

14. The process of claim 11, wherein the rosin soap or rosin soap derivative has a pH between about 8 and about 12.

15. The process of claim 11, wherein the rosin soap or rosin soap derivative has a pH between about 9 and about 11.

16. The process of claim 11, wherein the concrete curing coating compound self-degrades in the presence of UV radiation.

17. The process of claim 11, wherein the concrete curing coating compound is removable with detergent.

18. A process for retarding premature evaporation of water from freshly poured concrete comprising applying to the freshly poured concrete a water-resistant concrete curing coating compound of claim 1 comprising water, a hydrophobic membrane-forming polymer, an emulsifying agent, and 5.0-30.0 weight percent, based on the total weight of solids in the compound, of a film-forming rosin soap or rosin soap derivative that is non-dissolvable in water, and allowing the coating compound to dry thereby forming an easily removable barrier film complying with ASTM C 309.

19. The process of claim 18, wherein the hydrophobic membrane-forming polymer is a chlorinated rubber, a styrene copolymer, an acrylic copolymer, a hydrocarbon resin, or mixtures thereof.

20. The process of claim 18, wherein the rosin soap or rosin soap derivative has a pH between about 8 and about 12.

21. The process of claim 18, wherein the rosin soap or rosin soap derivative has a pH between about 9 and about 11.

22. The process of claim 18, wherein the concrete curing coating compound self-degrades in the presence of at least one of UV radiation and sunlight.

23. The process of claim 18, wherein the concrete curing coating compound is removable with detergent.

* * * * *